United States Patent [19]

Araki

[11] Patent Number: 4,979,160
[45] Date of Patent: Dec. 18, 1990

[54] FRONT LOADING DISK PLAYER

[75] Inventor: Yoshitugu Araki, Saitama, Japan

[73] Assignee: Pioneer Electronic Corporation, Tokyo, Japan

[21] Appl. No.: 400,854

[22] Filed: Aug. 30, 1989

[30] Foreign Application Priority Data

Sep. 5, 1988 [JP] Japan ............................ 63-116736[U]

[51] Int. Cl.$^5$ ........................................... G11B 33/02
[52] U.S. Cl. .................................. 369/75.2; 369/75.1;
369/77.1; 369/127; 369/190; 369/191; 369/204;
369/217; 369/233
[58] Field of Search ................... 369/75.1, 75.2, 77.1,
369/127, 187, 190, 191, 204, 217, 233, 282, 289,
291, 292

[56] References Cited

U.S. PATENT DOCUMENTS

| | | | |
|---|---|---|---|
| 3,141,676 | 7/1964 | Zarm | 369/77.1 |
| 4,523,306 | 6/1985 | Staar | 369/292 |
| 4,674,079 | 6/1987 | Agostini | 369/77.1 |
| 4,695,996 | 9/1987 | Sugihara et al. | 369/77.1 |
| 4,928,271 | 5/1990 | Verhagen | 369/289 X |

Primary Examiner—William M. Shoop, Jr.
Assistant Examiner—Randy W. Gibson
Attorney, Agent, or Firm—Sughrue, Mion, Zinn, Macpeak & Seas

[57] ABSTRACT

A front loading disk player has an insertion slot for receiving variable sizes of disks to be played. As the disk is inserted it encounters pinch rollers on the free ends of pivoting arms. The pressure on the pinch rollers is sensed causing the arms and their support members to move transversely of the insertion direction to open up and accommodate the diameter of the specific disk while still pinching the edge of the disk. When the disk reaches a certain stage of insertion where the central portion is past the insertion slot, the pinch rollers, arms and support members take over and pull the disk all the way into the disk player and place the disk on a turntable.

11 Claims, 8 Drawing Sheets

FRONT LOADING DISK PLAYER

BACKGROUND OF THE INVENTION

The present invention relates to a front loading disk player.

A front loading disk player is equipped with a disk transfer device which transfers a disk to be played through a disk insertion opening formed in the front panel of the player housing to the disk playing position.

In one type of conventional front loading disk player, as disclosed, for example, in Japanese Patent Publication, Gazette No. 61-45296, the disk is transferred by pinching it at its outer circumference instead of carrying it at the recording surface, thereby avoiding contamination of the recording surface. In addition, among front loading disk players of the pinching type, there are those which make it possible to transfer various disks of different diameters, as disclosed in the Japanese Patent Laid Open, Gazette No. 58-98869 and the like.

SUMMARY OF THE INVENTION

It is an object of the present invention to provide a front loading disk player which is equipped with a disk transfer device of the disk pinching type, and which makes it possible to transfer various disks of different diameters without contaminating the disk recording surface, and which, in particular, makes it possible to position the disk on the turntable with a high degree of accuracy.

The front loading disk player of the present invention is characterized in that it includes a housing, a disk insertion opening forming a disk insertion and ejection route and surrounding playing means, supporting means for supporting long carrying members so as to be free to move in parallel with the insertion and ejection route between a first position close to the disk insertion opening and a second position away from said disk insertion opening and free to approach and separate from each other, drawing means for moving the carrying members, first arm members provided on the carrying members to be free to move pivotally, second arm members attached to the free ends of the first arm members in a manner free to move pivotally, bias force imparting means for imparting bias forces to the first and second arm members, pinching rollers provided in the respective free end parts of the first and second arm members so as to be able to pinch the disk, and control means for controlling said driving means so as to keep apart both of the carrying members with each other so long as the sensor continues to detect a pressure which is greater than a predetermined value.

DETAILED DESCRIPTION OF THE PREFERRED EMBODIMENT

Referring to the accompanying drawings, a front loading disk player will be described in what follows as an embodiment of the present invention.

Figure 1:
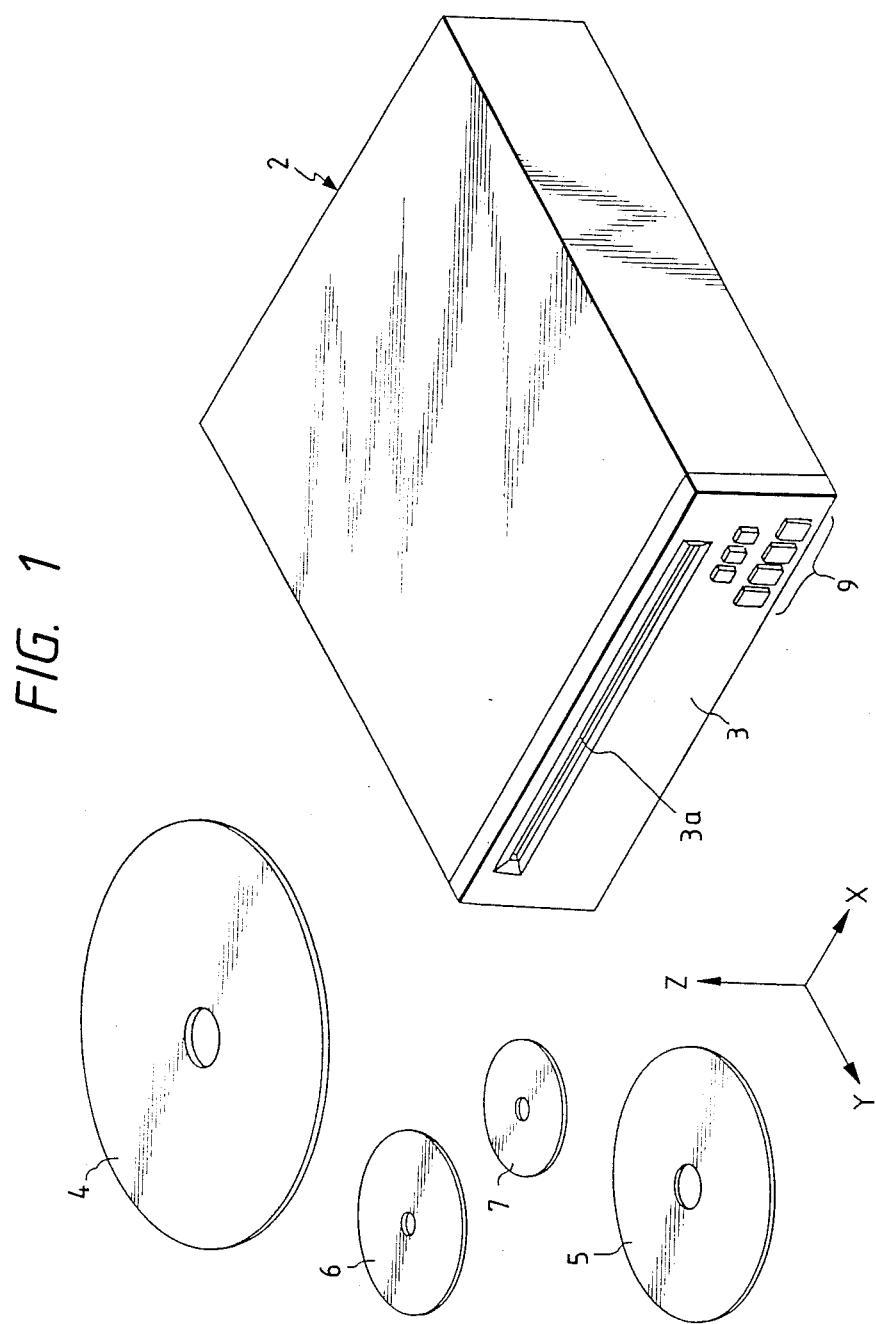
FIG. 1 is a perspective view of a front loading disk player in accordance with the present invention.

As shown in FIG. 1, in front panel part 3 of a player housing 2, there is provided a slot 3a extending in the left-right direction as a disk insertion opening for inserting any of the disks 4 through 7 into the housing for subsequent playback. It is to be noted here that the left-right direction of the insertion opening is along the X-axis, and the in-out direction of insertion is along the Y-axis. In addition, the upward direction is along the Z-axis. Disks 4 and 5 are assumed to be optical video disks of diameters of 30 cm and 20 cm, respectively, while disks 6 and 7 are assumed to be digital audio disks of diameters of 12 cm and 8 cm, respectively. Also provided in the front panel part 3 is a keyboard 9 for operating the disk player.

As shown in FIG. 2 to FIG. 6, inside of the player housing 2 there is provided a holding member 13 which is formed by fixing a main body 11 (shown in FIG. 3) and an upper plate 12 (shown in FIG. 3), formed respectively by bending sheet metal, by means of screws or welding. In addition, a platelike movable chassis 16 is arranged below the holding member 13. The movable chassis 16 is mounted on a fixed chassis 17, fixed to the player housing 2, and is freely movable in the up-down direction. More specifically, pins 16a, of which there are two on each side, are erected spaced in the front-back direction on the end parts on both of the left- and right-hand sides of the movable chassis 16, and the pins 16a are engaged freely slidably with guide apertures 17a (shown in FIG. 6) formed on the fixed chassis 17 extending in the up-down direction.

Figure 3:
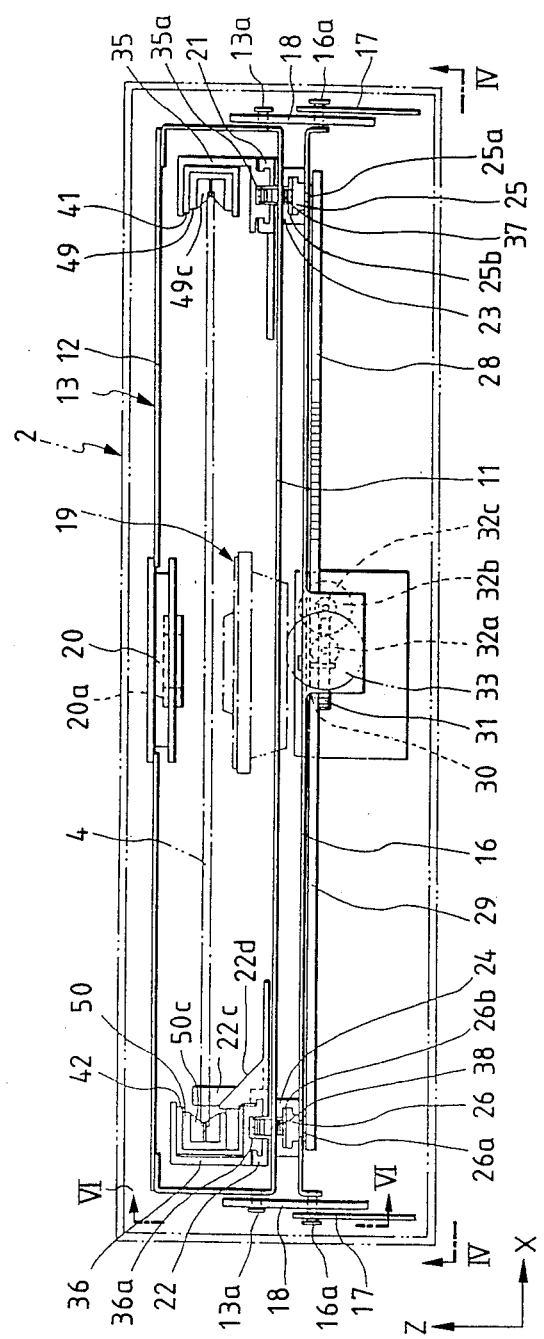
Figure 4:
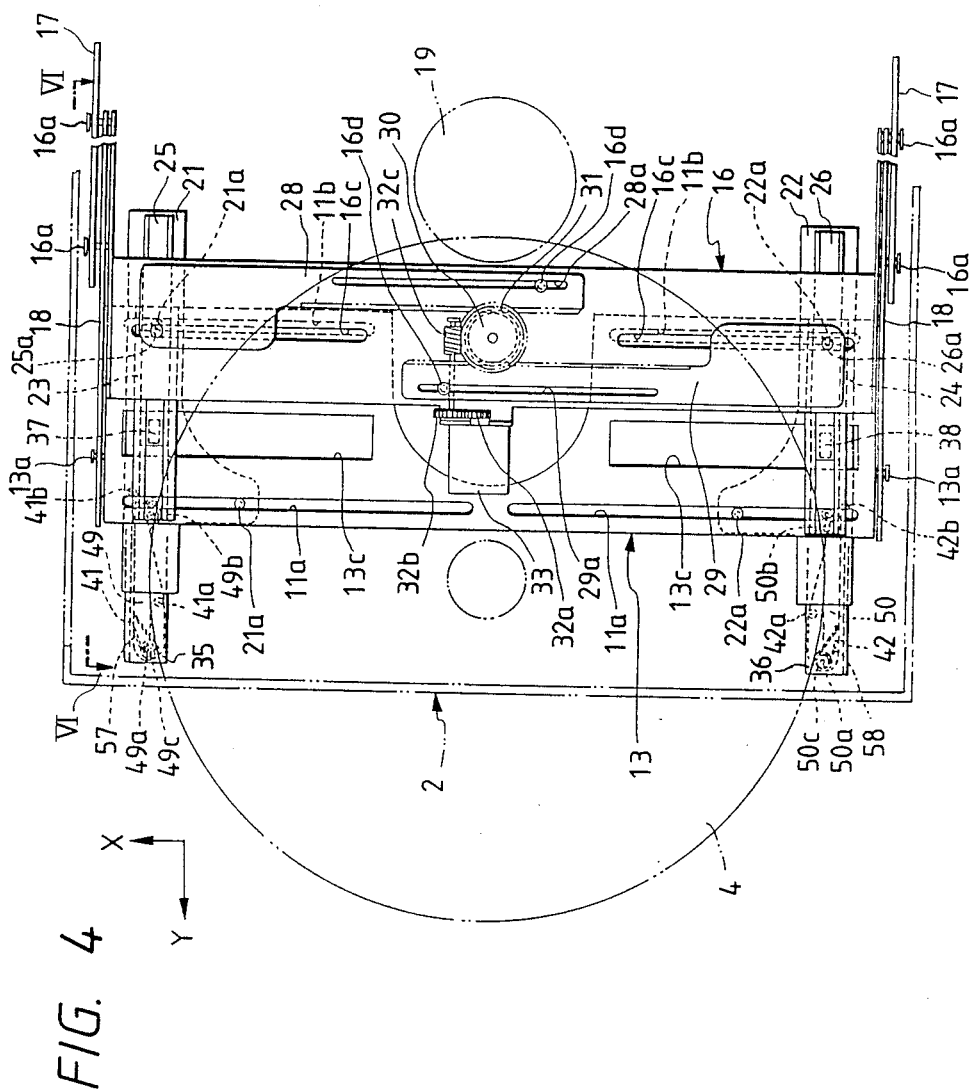
Figure 6:
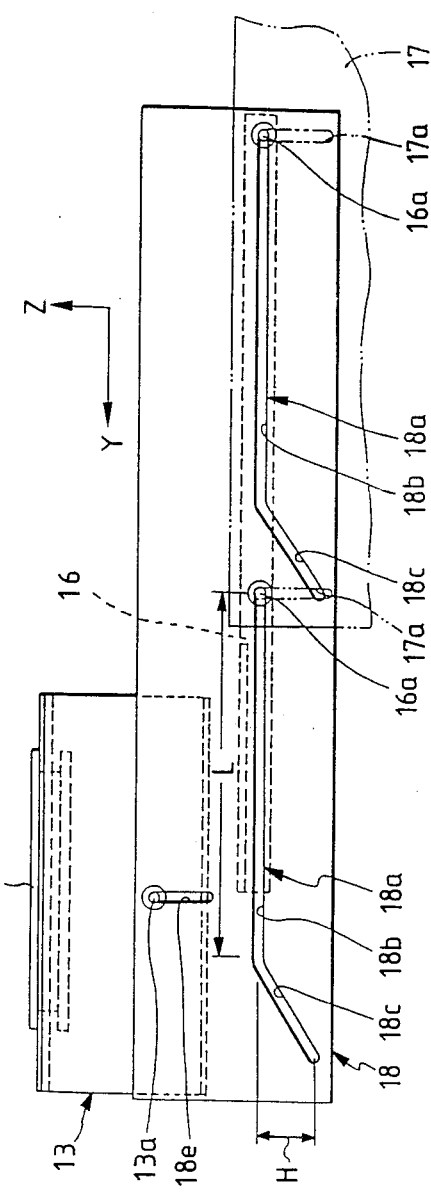
FIG. 6 is a view as seen along the line VI—VI in FIG. 3 and FIG. 4.

As shown in FIG. 3, FIG. 4 and FIG. 6, a pair of rectangular platelike traveling members 18 are disposed between the ends on the left- and right-side of the movable chassis 16 and the fixed chassis 17, and are mounted on the fixed chassis in a freely reciprocating manner only in the front-back direction. Each of the pins 16a erected on the movable chassis 16 is protruded to the outside of the fixed chassis through the guide apertures 17a on the fixed chassis 17, and are engaged slidably with cam apertures 18a (shown in FIG. 6) formed on the traveling members 18. As shown in FIG. 6, the cam aperture 18a of the traveling member 18 consists of a horizontal part 18b that extends in the front-back direction, and a tilted part 18c continued from the front end of the horizontal part 18b and inclined downward (direction opposite to that of the arrow Z) in the forward direction (direction of the arrow Y). Although not shown, there is also provided a driving source which moves the pair of traveling members 18 in a mutually synchronized manner with respect to the fixed chassis 17. Namely, a construction is provided by which the movable chassis 16 is moved in the up-down direction by the action of the tilted parts 18c of the cam apertures 18a as a result of reciprocating motion of both traveling members 18 by the operation of the driving source.

On the other hand, as shown in FIGS. 3, 4 and 6, pins 13a are provided protruding from both of the left and right end parts of the holding member 13 and are engaged slidably with oblong apertures 18e, which are formed in the vicinity of the front end of the moving members 18 and which extend in the up-down direction. This construction results in the holding member 13 moving in the front-back direction together with the traveling members 18, thereby accompanying the reciprocating motion of the traveling members 18. Further, the holding member 13 and the movable chassis 16 are united integrally in the up-down direction as a result of a construction that will be described later, and when the moving chassis 16 moves in the up-down direction, the holding member 13 moves up and down with the movable chassis 16 as a united body by the action of the tilted parts 18c of the cam apertures 18a. In this case, the pins 13a which protrude from the end parts of the holding member 13, slide along the oblong apertures 18e of the movable members 18.

As shown in FIGS. 3 and 6, a disk-shaped pressing member 20 for pressing the disk toward the disk carrying surface of a turntable 19 is mounted rotatably in the central part of the upper plate 12, which is a constituent member of the holding member 13. As shown in FIG. 3, the pressing member 20 includes a magnet 20a, and the disk is pressed against the turntable 19 when the magnet 20a is attracted to a magnetic member (not shown) provided on the turntable 19. The turntable 19 is provided fixed at a predetermined position within the player housing 2.

As shown in FIGS. 2 through 5, a pair of carrying members 21 and 22 are arranged on the main body 11, facing each other along the disk insertion direction. Pins 21a and 22a, each consisting of three pins, are erected on the carrying members 21 and 22, respectively, and each of these pins is engaged slidably with long and short guide apertures 11a and 11b formed on the main body 11 and extending in the direction perpendicular to the disk insertion direction, namely, in the left-right direction. The carrying members 21 and 22 are free to approach or separate from each other in the left-right direction. The carrying members 21 and 22 are coupled with sliders 23 and 24, respectively, by means of screws or the like, and the sliders 23 and 24 also move in the left-right direction with respect to the main body 11 together with the carrying members 21 and 22. The sliders 23 and 24 slide over rails 25 and 26, which are provided on the top surface of the movable chassis 16 and which extend in the front-back direction. It is to be noted that there are formed anti-disengagement parts on the sliders 23 and 24 from the rails 25 and 26, respectively, and the sliders are arranged to be free to move only in the front-back direction with respect to the rails 25 and 26 and are inhibited from moving in any other direction. As shown in FIG. 3 and FIG. 4, one end of each of the rails 25 and 26 is coupled with one end of each of the linking pins 25a and 26a of a pair of rack members 28 and 29 arranged on the bottom surface of the movable chassis 16. The linking pins 25a and 26a are engaged slidably with each of a pair of guide apertures 16c formed in the movable chassis 16 extending in the left-right direction. Further, guide apertures 28a and 29a are formed on the other end of the rack members 28 and 29, respectively, and are parallel with the guide apertures 16c, which are engaged slidably with pins 16d that protrude from the bottom surface of the movable chassis 16. With this construction, each of the rails 25 and 26 is slidable in the left-right direction together with the rack members 28 and 29.

Figure 5:
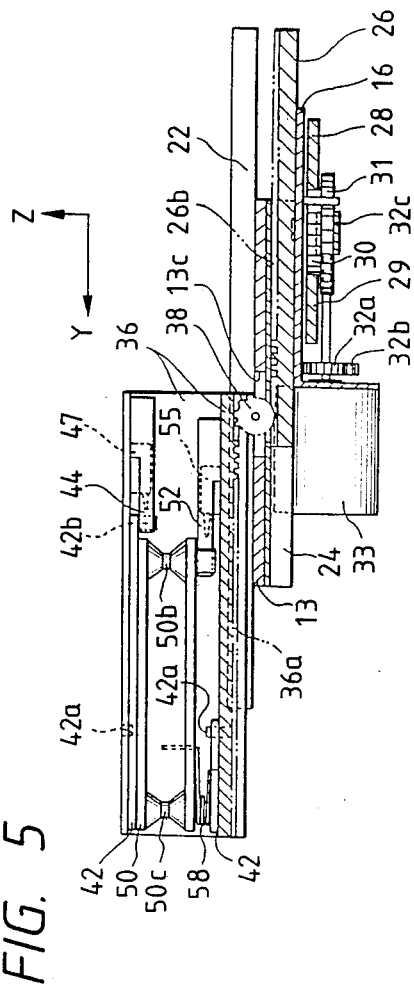
FIG. 5 is a view as seen along the line V—V in FIG. 2.

As shown in FIGS. 3 through 5, a pinion 30 is arranged on the movable chassis 16 at a position sandwiched by the pair of rack members 28 and 29, meshed with both of the rack members. The pinion 30 is molded integrally with a worm wheel 31, and the worm wheel 31 is rotated by a motor 33 via successive gears 32a, 32b and a worm 32c. Accordingly, with the rotation of the motor 33, both of the rack members 28 and 29 carry out relative reciprocating motion synchronized with each other.

As described in the foregoing, the rack members 28 and 29 are respectively coupled with the rails 25 and 26 and the pins 25a and 26a. Each of the rails is engaged and relatively movable only in the front-back direction with each of the sliders 23 and 24, and each of the sliders is coupled with each of the carrying members 21 and 22 by means of screws or the like. Therefore, the carrying members 21 and 22 move in the left-right direction with the rack members 28 and 29 when the motor 33 is rotated.

Driving means is constructed by the pair of traveling members 18, the driving source for driving the movable members, the motor 33 and the driving force transmission mechanism which, including the pinion 30, rack members 28 and 29 and other members, transmits the driving force of the motor to the carrying members 21 and 22.

Figure 2:
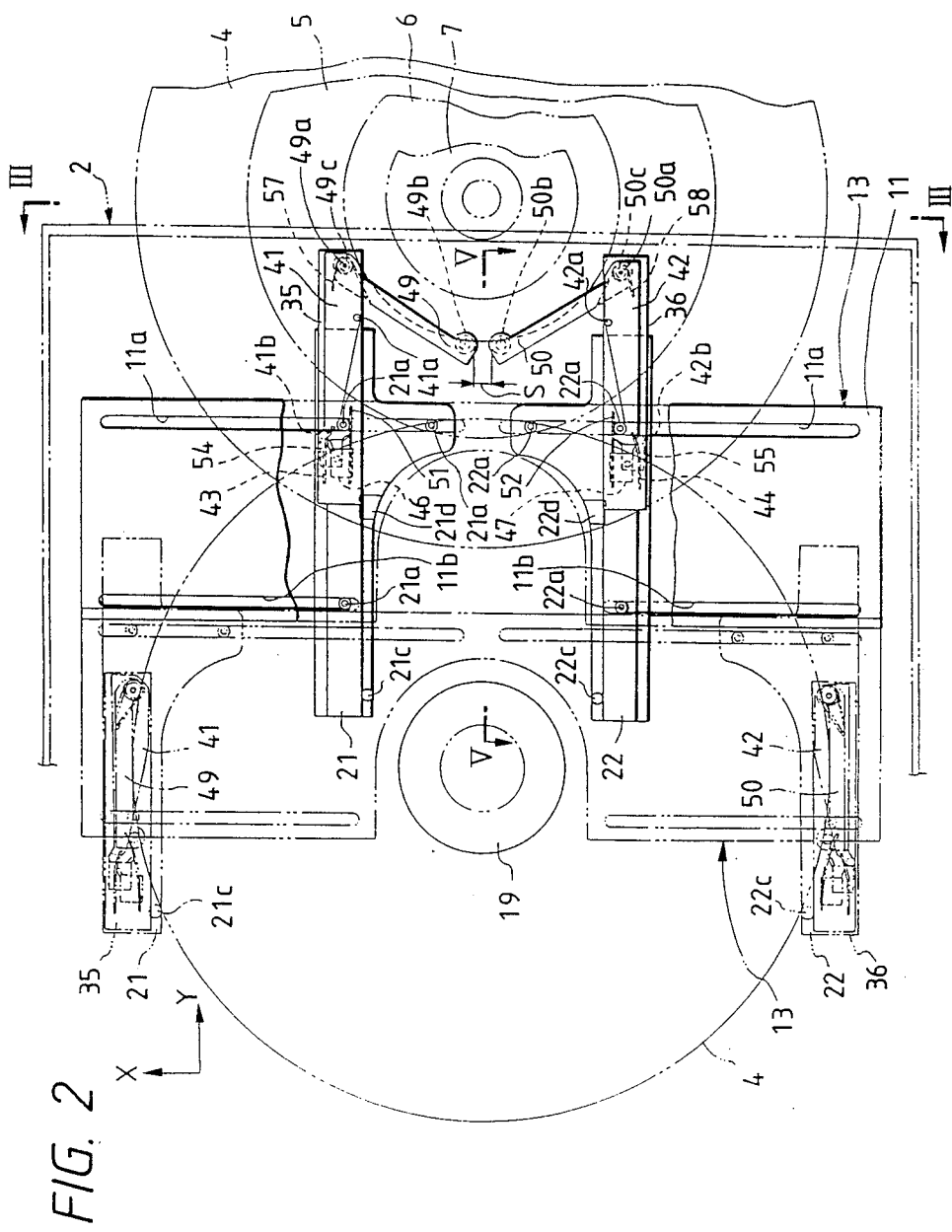
FIGS. 2, 3 and 4 are a plan view, a front view and a bottom view, respectively, of the internal structure of the front loading disk player shown in FIG. 1.

As shown in FIGS. 2 and 5, on the pair of carrying members 21 and 22 there are provided supporting members 35 and 36, respectively, slidably in the front-back direction. On the bottom surfaces of the supporting members 35 and 36 there are formed rack parts 35a and 36a in the moving direction of the supporting members, namely, in the left-right direction, with pinions 37 and 38 mounted on the carrying members 21 and 22, respectively, meshed with the respective rack parts. Further, rack parts 25b and 26b are formed also on the top surfaces of the rails 25 and 26 provided on the movable chassis 16 and the pinions 37 and 38 are meshed also with the rack parts 25b and 26b.

A speed multiplying mechanism is constructed by the rack parts 35a, 36a, 25b, and 26b, and the pinions 37 and 38. By means of the speed multiplying mechanism, the supporting members 35 and 36 are moved at a speed twice the moving speed of the holding member in response to the movement in the front-back direction of the holding member 13. In addition, because of the construction as mentioned previously, the supporting members 35 and 36 are displaced over a distance which is twice the distance over which the holding member 13 is moved. It should be noted that the carrying members 21 and 22 which carry the pinions 37 and 38 are forced to move in the left-right direction on the holding member 13. However, to avoid the possible interference of the pinions 37 and 38 with the holding member 13 during the above movement, there are formed openings 13c in the holding member 13.

As shown in FIGS. 2 through 5, first arm members 41 and 42 are provided extending in the front-back direction on the supporting members 35 and 36, mounted free to move pivotally on the supporting members 35 and 36 with pivotal support shafts 41a and 42a as the centers. The pivotal support shafts 41a and 42a extend in the up-down direction, and the pivotal motions of the first arm members 41 and 42 are executed in a plane perpendicular to the pivotal support shafts. Pins 41b and 42b are provided protruding downward at the rear end parts of the first arm members 41 and 42, and the pins 41b and 42b can be brought into contact with the free ends of sheet springs 43 and 44 that are fixed to the supporting members 35 and 36, respectively, in the form of cantilevers. On the supporting members 35 and 36 there are also provided detection switches 46 and 47 so as to permit their actuators to be engaged with the respective vicinities of the free ends of the sheet springs 43 and 44. Namely, by the pivotal motion by predetermined angles of the first arm members 41 and 42, the detection switches 46 and 47 are made to be opened and closed via the sheet springs 43 and 44. It is to be noted that the sheet springs 43 and 44 act also as bias force imparting means which impart bias forces in the directions in which the first arm members 41 and 42 move away from the actuators of the detection switches 46 and 47.

In the front end parts of the first arm members 41 and 42 there are mounted second arm members 49 and 50 free to move pivotally at their respective one ends with the pivotal support shafts 49a and 50a as the centers. The pivotal support shafts 49a and 50a extend parallel to the pivotal support shafts 41a and 42a of the first arm members 41 and 42, and hence the second arm members move pivotally in a plane parallel to the plane of pivotal motion of the first arm members 41 and 42. Pinching rollers 49b and 50b are formed extending downward at the free end parts of the second arm members 49 and 50, respectively, and the pinching rollers 49b and 50b can abut on the free end parts of the sheet springs 51 and 52 that are fixed to the supporting members 35 and 36, respectively, in the form of cantilevers. On the supporting members 35 and 36 there are provided detection switches 54 and 55 so as to allow the actuators of the switches and the vicinity of the respective free ends of the sheet springs 51 and 52 to be engaged with each other. Namely, a construction is provided in which, when the second arm members 49 and 50 are moved pivotally to bring the pinching rollers 49b and 50b into contact with the sheet springs 51 and 52, the detection switches 54 and 55 are actuated by bending the sheet springs. The sheet springs 51 and 52 act also as bias force imparting means to impart bias forces to the second arm members 49 and 50 in the direction to move away from the actuators of the detection switches 54 and 55. Further, spring members 57 and 58 are engaged with the second arm members 49 and 50 which give bias forces to the second arm members in the same direction as in the above. Further, in the present embodiment, detection switches 46, 47, 54 and 55 act as sensors. However, photocouplers or the like may be used.

Pinching rollers 49b and 50b formed in the free end parts of the second arm members 49 and 50 are disposed in the tip parts of the first arm members 41 and 42. The pinching rollers 49c and 50c are molded integrally with the second arm members 49 and 50 and are fitted to the pivotal support shafts 49a and 50a to their outside.

Each of the pinching rollers 49b, 49c, 50b and 50c are for pinching the outer circumferential part of the disk. As is clear from FIG. 3, they have on their outer circumferences tapered parts guiding the outer circumferential part of the disk, and smaller diameter parts for positioning the disk in the central parts continued to the tapered parts. The detection switches 46, 47, 54 and 55 act as sensors for detecting the pressure applied to the pinching rollers from the disk.

Further, as shown in FIG. 2, the minimum distance S between the pinching rollers 49b and 50b, provided on the free end parts of the pair of the second arm members 49 and 50, is smaller than the diameter of the smallest diameter disk 7. Further, the second arm members 49 and 50 oscillate in a region further away from the insertion opening 3a with respect to the pivotal support points 49a and 50a, and with this construction the second arm members 49 and 50 can be oscillated smoothly in response to the insertion of the disk. Further, as shown in FIGS. 2 and 3, cylindrical projections 21c and 22c for positioning a disk with maximum diameter are formed abutting on the outer circumference of the maximum diameter disk 4 at the rear end parts of the pair of carrying members 21 and 22. At the central parts of each of the carrying members there are formed tapered parts 21d and 22d for guiding the outer circumference of the disk placed on the turntable to the pinching rollers 49b, 49c, 50b and 50c by sliding the outer circumference of the disk when removing the disk away from the turntable. Note, however, that in FIG. 3 there are shown only the cylindrical projection 22c and that the tapered part 22d without showing the cylindrical projection 21c and the tapered part 21d.

Figure 7:
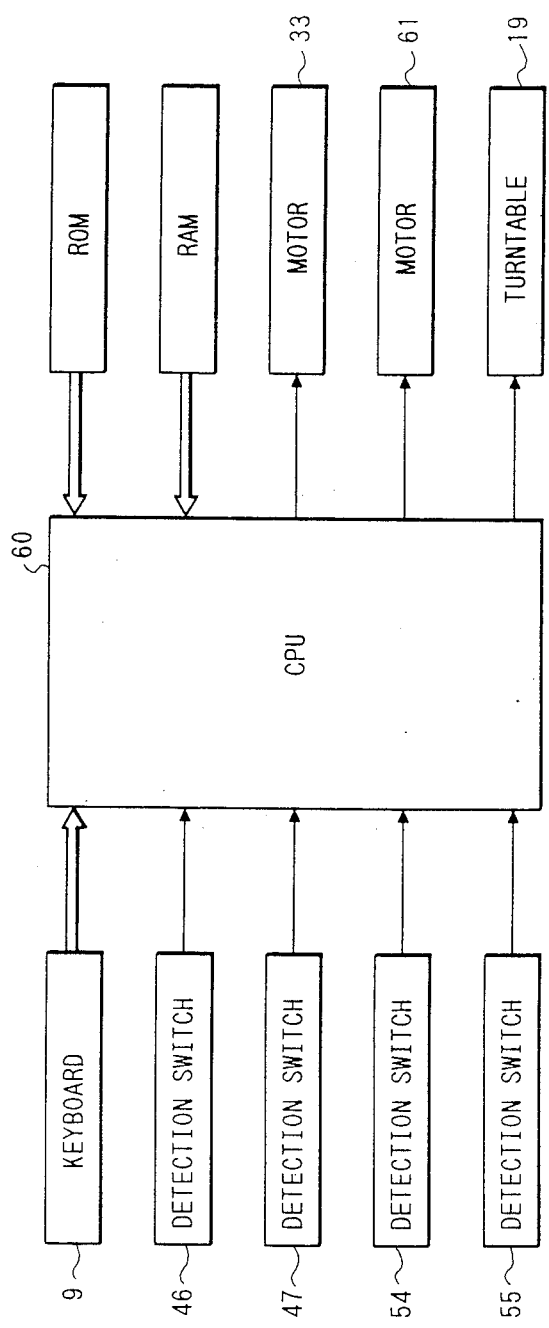
FIG. 7 is a diagram showing the control of the front loading disk player shown in FIGS. 1 through 6.

It is to be noted as shown in FIG. 7, that each signal issued from the keyboard 9 and from detection switches 46, 47, 54 and 55 is transmitted to a control part (CPU) 60 arranged in a predetermined position. The motor 33, the turntable 19 and the like are operated with timings that will be described later by the operating signals sent from the control part in response to each signal.

Figure 8:
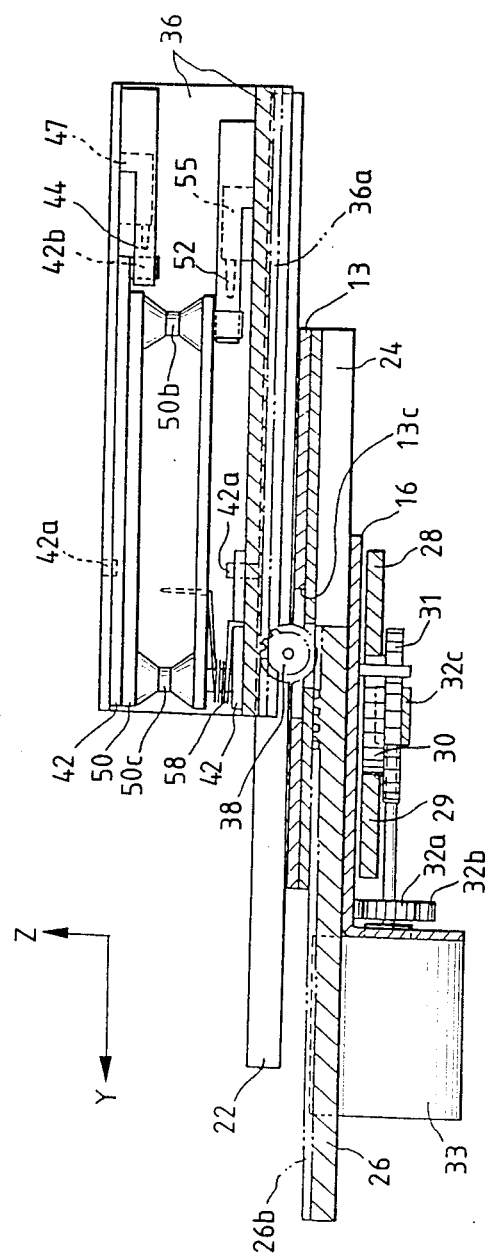
FIG. 8 is a diagram illustrating the operation of the internal structure of the front loading disk player.

Next, referring to FIGS. 1-6 and also to FIGS. 8 and 9, the operation of the front loading disk player with the above construction will be described briefly.

First, a disk 4 with diameter 30 cm, for example, is inserted to the inside of the player housing through the slot 3a in the front panel 3 as shown in FIG. 1. The pinching rollers 49b, 49c, 50b and 50c can pinch the disk under the condition in which the disk center hole is sticking out of the player housing (condition shown in FIG. 2). When the insertion of the disk 4 starts, the end part in the insertion direction of the disk abuts on the pinching rollers 49b and 50b provided at the free end parts of the pair of the second arm members 49 and 50. Accordingly, both of the second arm members 49 and 50 are moved pivotally toward the rear from the initial position shown in FIG. 2 accompanying the insertion of the disk 4. When the disk 4 is inserted a predetermined distance, thereby moving pivotally the second arm members 49 and 50, the end part in the insertion direction of the disk 4 abuts on other pinching rollers 49c and 50c arranged on the tips of the first arm members 41 and 42 so that both of the first arm members are moved pivotally also.

When the first arm members 41 and 42 are moved pivotally, the pins 41b and 42b formed at the rear ends of the first arm members cause the detection switches 46 and 47 to be closed simultaneously via the sheet springs 43 and 44, respectively. With reference to FIG. 9, the operational condition of the detection switches 46 and 47, where both detection switches 46 and 47 are in the state of being closed, is represented by A=1, and the state in which both are in the condition of being open is represented by A=0. When both switches 46 and 47 are closed, this indicates that the disk 4 is passing the center of the insertion route of the disk. Further, if only one of the two detection switches is closed, it indicates that the disk 4 has deviated from the central disk insertion route.

Figure 9:
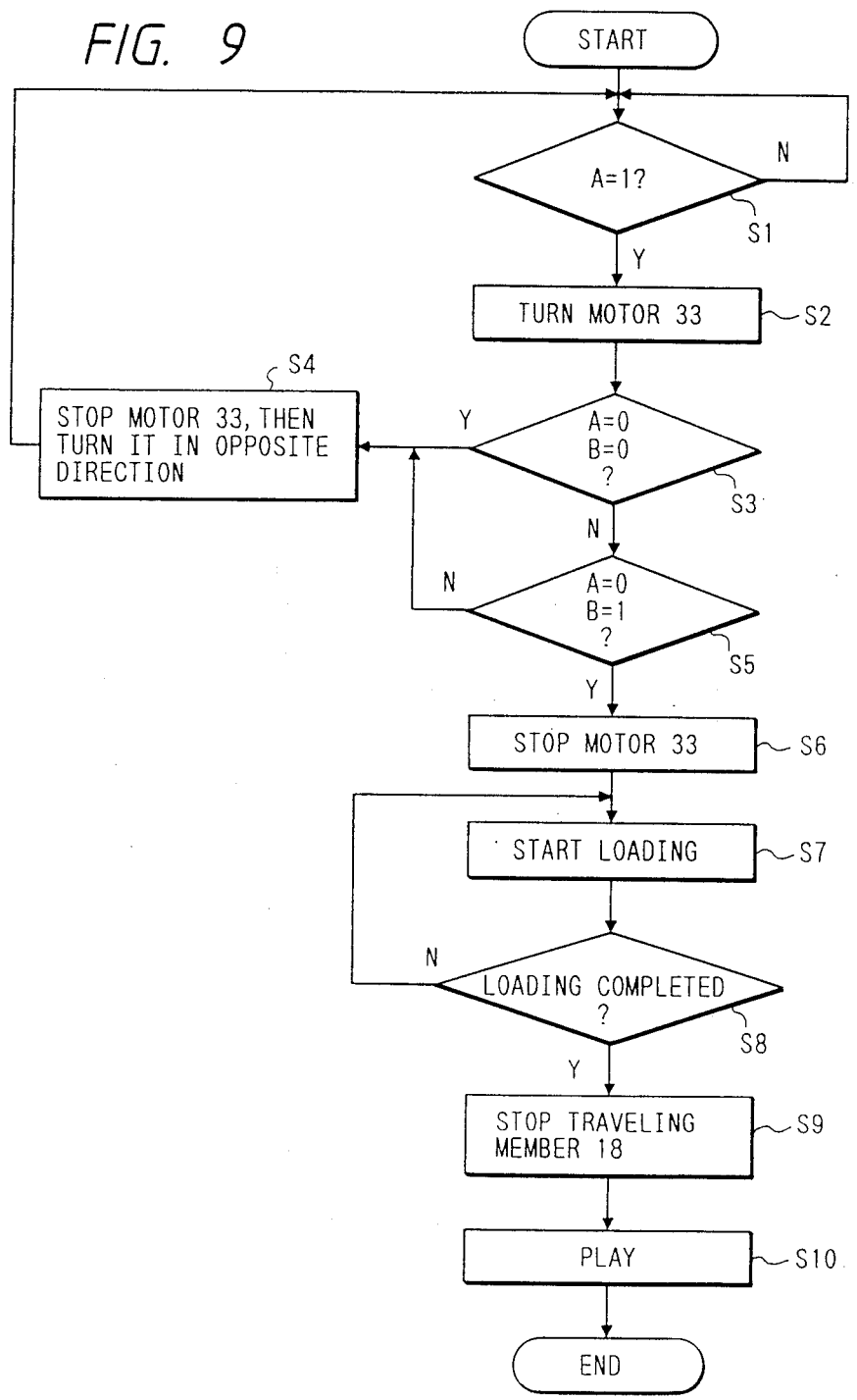
FIG. 9 is a flow chart illustrating the operation of the front loading disk player.

As shown in FIG. 9, when the disk 4 is inserted a predetermined amount and the detection switches 46 and 47 are closed (step S1), the control part causes the motor 33 to be turned in the forward direction (step S2). As a result, the pair of rack members 28 and 29 are driven, and the carrying members 21 and 22 that carry the respective arm members are moved to the left direction and the right direction, respectively, in order to be separated one from the other. Therefore, the disk 4 can now be inserted further inside the housing, so that the operator inserts the disk further into the housing. Accompanying this, the second arm members 49 and 50 are moved pivotally further to the rear. When most of the disk 4 is inserted within the player housing as shown in FIG. 4, the second arms 49 and 50 are brought to a condition where they are nearly parallel to the first arm members 41 and 42. As a result, the free end parts of the second arm members 49 and 50 cause the other detection switches 54 and 55 to be closed simultaneously via the sheet springs 51 and 52. The operational condition of these detection switches 54 and 55 is represented as B in FIG. 9. Namely, the state in which both of the detection switches 54 and 55 are closed is represented by B=1, while the state in which both are opened is represented by B=0.

When the operator interrupts the insertion of the disk 4 half-way, the free end parts of the first arm members 41 and 42 and the second arm members 49 and 50 depart from the actuators of the detection switches 46, 47, 54 and 55. Consequently, both of A and B become zero as shown in FIG. 9, step S3. In this case, the motor 33 is brought to a stop and the operation of mutual separation of the carrying members 21 and 22 is interrupted. Thereafter, the motor 33 is rotated in the reverse direction, the disk is energized in the ejection direction, and is brought back to the initial condition as indicated by the solid lines in FIG. 2 (step S4).

When disk insertion is carried out to the state as shown in FIG. 4 without being interrupted, it goes to A=0 and B=1 (step S5), and the disk 4 will be securely pinched at its outer circumference with the four pinching rollers 49b, 49c, 50b and 50c. Then, the motor 33 is brought to a stop (step S6). Next, a motor 61 shown in FIG. 7 is turned, by which the traveling members 18 are driven toward the rear and the disk 4, which is pinched by the above-mentioned four pinching rollers, is carried a distance L (shown in FIG. 6) toward the rear together with the holding member 13 (step S7), reaching directly above the turntable 9. FIG. 8 shows the state in which the holding member 13 is moved to the rear. Following this, the traveling members 18 are driven further to the rear, and the moveable chassis 16 and the holding member 13 are lowered by a vertical distance H under the action of the tilted parts 18c of the cam apertures 18a formed in the movable members. As a result of this operation, the disk 4 is placed on the disk carrying surface of the turntable 19, and is clamped by the pressing member 20. When this disk loading operation is detected by detection means which is not shown (step S8), the traveling members 18 are brought to a stop (step S9). Then, each of the pinching rollers 49b, 49c, 50b and 50c is detached from the outer circumference of the disk 4 by releasing means which is not shown.

In this manner, it becomes ready to play, and playing of the disk 4 is executed by the operation of the turntable 19 and the pickup (not shown) (step S10).

As shown in FIG. 9, when the playing is completed (step S11), the disk 4 is sent back to the position shown in FIG. 4 by tracing backward the steps described above. Then, with the opening of all of the detection switches 46, 47, 54 and 55 upon recovery of the disk 4 by the operator, the carrying members 21 and 22 are sent back to the initial positions shown by the solid lines in FIG. 2.

The operation described in the foregoing is carried out in the same way irrespective of the size of the disk, so that there is no need to separately describe the insertion operation for the other disks 5 to 7.

Moreover, the above-mentioned embodiment has a speed doubling mechanism in the transfer mechanism for transferring a disk that is inserted from the insertion opening 3a in the front-back direction, so that the time required for transferring the disk can be reduced, and it is possible to do away with the disk transfer stroke.

As described in detail in the foregoing, the front loading disk player of the present invention includes a housing, having a disk insertion opening which forms a disk insertion and ejection route; a playing means in the housing; supporting means for supporting long carrying members in a manner movable in parallel with the disk insertion and ejection route and also movable freely towards and away from each other between a first position nearer the disk insertion opening and a second position farther away from it; driving means for moving the carrying members; first arm members provided to move pivotally on the carrying members; second arm members mounted to move pivotally on the free ends of the first arm members; bias force imparting means for imparting bias forces to the first and the second arm members; pinching rollers capable of pinching the disk provided on the free ends of each of the first and the second arm members; sensors for detecting pressures exerted on the pinching rollers; and control means for controlling the driving means so as to further separate the carrying members from one another so long as the sensor continues to detect pressures that are not less than predetermined values.

Because of the construction of the player as described above, it can transfer various disks of different diameters without spoiling the recording surface of the disk or causing damage to it. In addition, pinching rollers that pinch a disk are mounted on the free ends of the arm members that move pivotally, and, the pinching rollers always press on the outer circumference of the disk by the use of the bias force imparting means. Therefore, there will be no vibration of the disk during transit, making it possible to execute highly precise positioning of the disk with respect to the turntable.

WHAT IS CLAIMED:

1. A front loading disk player comprising:
   a housing having a disk insertion opening that forms a disk insertion and ejection route;
   a playing means inside said housing;
   supporting means in said housing;
   a pair of long carrying members supported by said supporting means in such a manner which allows movement in parallel with said insertion and ejection route between a first position close to said disk insertion opening and a second position away from said disk insertion opening, and which allows movement toward and away from each other;
   driving means for moving said carrying members;
   a pair of first arm members provided, respectively, on said carrying members, each having a pivot end, serving as a pivot point, and a free end;
   a pair of second arm members, pivotally attached, respectively, to the free ends of said first arm members at pivot ends of said second arm members, said second arm members each having a free end; said first and second arm members being pivotably rotatable about their respective pivot ends;

bias force imparting means for imparting bias forces to said first and second arm members to bias said arm members in predetermined rotational directions, respectively;

pinching rollers provided at the respective free end parts of said first and second arm members so as to be able to pinch said disk;

sensor means positioned in said housing for detecting the pressure of a disk against said pinching rollers;

and control means responsive to said sensor means for causing said drive means to drive said carrying members apart from each other to accommodate the specific size of a disk inserted into said insertion opening and in the insertion direction to carry said disk to said playing means, when said sensors detect a predetermined disk pressure on said pinching rollers.

2. A front loading disk player as claimed in claim 1, wherein said second arm members are pivotally attached so that the free ends thereof are free to pivot away from said disk insertion opening.

3. A front loading disk player as claimed in claims 1 or 2, further comprising a pair of supporting members provided freely movably along said disk insertion and ejection route on said carrying members, respectively, to support said first arm members, and a pair of speed multiplying mechanisms which move said supporting members, respectively, along said insertion and ejection route at a speed that is a prescribed multiple of the moving speed of said carrier members in response to the motion of said carrying members.

4. A front loading disk player as claimed in claim 1, wherein the minimum distance between said pinching rollers provided in said second arm members is smaller than the minimum diameter of disk for which said disk player is designed.

5. A front loading disk player as claimed in claim 1, wherein said pinching rollers are capable of pinching said disk under a condition in which the hole at the center of the disk is sticking out of said housing.

6. A front loading disk player as claimed in claim 2, wherein the minimum distance between said pinching rollers provided in said second arm members is smaller than the minimum diameter of disk for which said disk player is designed.

7. A front loading disk player as claimed in claim 3, wherein the minimum distance between said pinching rollers provided in said second arm members is smaller than the minimum diameter of disk for which said disk player is designed.

8. A front loading disk player as claimed in claim 2, wherein said pinching rollers are capable of pinching said disk under a condition in which the hole at the center of the disk is sticking out of said housing.

9. A front loading disk player as claimed in claim 3, wherein said pinching rollers are capable of pinching said disk under a condition in which the hole at the center of the disk is sticking out of said housing.

10. A front loading disk player as claimed in claim 4, wherein said pinching rollers are capable of pinching said disk under a condition in which the hole at the center of the disk is sticking out of said housing.

11. A front loading disk player comprising:

a housing having an insertion slot therein for receiving and ejecting disks of varying size diameters to be played;

a turntable for rotating said disk; said turntable being located within said housing;

a pair of arm support means located within said housing and moveable in the insertion/ejection direction as well as moveable transversely thereto so as to approach one another or separate from one another;

a pair of first pivoting arms and a pair of second pivoting arms supported respectively by said arm support means; said arms being attached pivotally such that said first arm pivots at a pivot end thereof on said arm support means so that the free end thereof is moveable in an arc toward the center of said housing, and said second arm pivots at a pivot end thereof on said free end of said first arm so that the free end of said second arm is moveable in an arc towards and away from the insertion slot;

bias means for biasing said first and second arms so that the free ends of said first arms are urged toward said housing center and the free ends of said second arms are biased toward said insertion opening;

pinch rollers for pinching the circumferential edge of a disk inserted in said housing, one each being located adjacent and moveable with the free ends of each of said arms;

sensor switches associated with each said arm for detecting certain predetermined positions of said arms resulting when said disk is inserted and pressing against said pinch rollers; and control means responsive to said sensor switches for driving said arm support means in said transverse direction to accommodate the diameter of a disk inserted in said housing and for driving said arm support means in said insertion direction to deliver said disk, pinched by said pinch rollers, to said turntable.

* * * * *